(12) United States Patent
Chang et al.

(10) Patent No.: US 11,092,351 B2
(45) Date of Patent: Aug. 17, 2021

(54) HVAC APPARATUS WITH ALERTING FUNCTION OF COMPONENT EFFICACY DECLINING, AND ALERTING METHOD FOR THE SAME

(71) Applicant: Chicony Power Technology Co., Ltd., New Taipei (TW)

(72) Inventors: Tse-Wen Chang, New Taipei (TW); Wen-Yen Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 10 days.

(21) Appl. No.: 16/831,784

(22) Filed: Mar. 26, 2020

(65) Prior Publication Data

US 2020/0318841 A1    Oct. 8, 2020

Related U.S. Application Data

(60) Provisional application No. 62/828,505, filed on Apr. 3, 2019.

(30) Foreign Application Priority Data

Dec. 10, 2019    (TW) ................. 108145101

(51) Int. Cl.
```
F24F 11/39      (2018.01)
G05B 23/02      (2006.01)
F24F 110/40     (2018.01)
```
(52) U.S. Cl.
CPC ............ *F24F 11/39* (2018.01); *G05B 23/027* (2013.01); *G05B 23/0254* (2013.01); *G05B 23/0283* (2013.01); *F24F 2110/40* (2018.01)

(58) Field of Classification Search
CPC ........ F24F 11/39; F24F 2110/40; F24F 11/61; F24F 11/64; F24F 11/30; F24F 11/70;
(Continued)

(56) References Cited

U.S. PATENT DOCUMENTS

| 6,228,155 B1 | 5/2001 | Tai |
| 6,993,414 B2 | 1/2006 | Shah |

(Continued)

FOREIGN PATENT DOCUMENTS

| CN | 1894641 A | 1/2007 |
| CN | 102200076 A | 9/2011 |

(Continued)

OTHER PUBLICATIONS

Office Action dated Aug. 4, 2020 of the corresponding Taiwan patent application No. 108145101.
(Continued)

*Primary Examiner* — Jigneshkumar C Patel
(74) *Attorney, Agent, or Firm* — Chun-Ming Shih; HDLS IPR Services (57) ABSTRACT

A method for alerting component efficacy declining of HVAC apparatus includes: continually recording working time of a fan of an HVAC apparatus and controlling a pressure-difference transmitter arranged on both sides of a filter of the HVAC apparatus for calculating current pressure difference; calculating a first-stage slope based on a first pressure-difference condition, an initial pressure difference, and an accumulated working time of the fan when the current pressure difference reaches the first pressure-difference condition; calculating a second-stage slope based on a second pressure-difference condition, the first pressure-difference condition, and the accumulated working time of the fan when the current pressure difference reaches the second pressure-difference condition; predicting a remaining lifetime of the filter based on the first-stage slope if a comparison result between the two slopes is smaller than or equal to a threshold; otherwise, predicting the remaining lifetime of the filter based on the second-stage slope.

17 Claims, 6 Drawing Sheets

(58) Field of Classification Search
CPC ... F24F 11/89; F24F 2110/52; G05B 23/0283; G05B 23/027; G05B 23/0254; G08B 21/18; G08B 21/182; G08B 31/00
USPC .......................................................... 700/276
See application file for complete search history.

(56) References Cited

U.S. PATENT DOCUMENTS

| | | | |
|---|---|---|---|
| 7,261,762 B2 | 8/2007 | Kang et al. | |
| 8,613,792 B2 | 12/2013 | Ragland et al. | |
| 2011/0185895 A1 | 8/2011 | Freen | |
| 2012/0125592 A1* | 5/2012 | Fadell | G05B 15/02 165/201 |
| 2012/0323377 A1* | 12/2012 | Hoglund | F24F 11/30 700/277 |
| 2016/0327491 A1 | 11/2016 | Wood | |
| 2016/0356247 A1 | 12/2016 | Dudar | |
| 2017/0361259 A1* | 12/2017 | Fox | B01D 46/0086 |

FOREIGN PATENT DOCUMENTS

| | | |
|---|---|---|
| CN | 105987820 A | 10/2016 |
| CN | 107054014 A | 8/2017 |
| CN | 107825939 A | 3/2018 |
| CN | 108201751 A | 6/2018 |
| CN | 108627439 A | 10/2018 |
| CN | 208588052 U | 3/2019 |
| TW | 201122379 A | 7/2011 |
| TW | I432686 B | 4/2014 |
| TW | 201524580 A | 7/2015 |
| TW | M507514 U | 8/2015 |
| TW | 201606246 A | 2/2016 |
| TW | I607191 B | 12/2017 |
| TW | I646420 B | 1/2019 |
| WO | 2004037383 A1 | 5/2004 |
| WO | 2019046381 A1 | 3/2019 |

OTHER PUBLICATIONS

Office Action dated Apr. 25, 2021 of the corresponding China patent application No. 201911308134.9.

* cited by examiner

HVAC APPARATUS WITH ALERTING FUNCTION OF COMPONENT EFFICACY DECLINING, AND ALERTING METHOD FOR THE SAME

BACKGROUND OF THE INVENTION

1. Technical Field

The present invention relates to a heating, ventilation and air conditioning (HVAC) apparatus, especially to an HVAC apparatus with alerting function for component efficacy declining and an alerting method for component efficacy declining of HVAC apparatus.

2. Description of Prior Art

The heating, ventilation and air conditioning (HVAC) apparatus is generically arranged to provide heat exchange for indoor space and provide more comfortable air for the indoor space.

The HVAC apparatus is a heat exchange apparatus with the interaction of gas fluid and liquid fluid. The pollutant in the gas and liquid will gradually attach to the filter and heat exchange coil in the HVAC apparatus as the working time of the HVAC apparatus accumulates. The attached pollutant will degrade the heat exchange efficacy of the HVAC apparatus and the consumed energy of the HVAC apparatus during operation increases.

The present HVAC apparatus generally uses pressure sensor to sense pressure difference between the front side and the back side of the filter (or the heat exchange coil). When the pressure difference reaches a threshold due to the pollutant clogged in filter (or the heat exchange coil), the HVAC apparatus sends a warning message. Upon receiving the warning message, the management staff can dispatch maintenance staff to conduct maintenance schedules (such as replacing or cleaning the filter) for the HVAC apparatus.

However, above warning is a passive way. Namely, the management staff is not aware of the component efficacy declining (such as serious clogging of filter) due to the pollutant until the management staff gets a warning message. The management staff still needs additional time to organize the maintenance schedules and prepare spare parts, the maintenance task is undesirably delayed.

As mentioned above, in the prior art HVAC apparatus, the management staff does not have effective way to organize the maintenance task. It is inconvenient for the arrangement and dispatch of maintenance staff. Besides, when more than one HVAC apparatus need maintenance, management of the stock of spare parts (such as new filter) is also cumbersome.

SUMMARY OF THE INVENTION

It is an object of the present invention to provide an HVAC apparatus with alerting function for component efficacy declining and an alerting method for component efficacy declining of HVAC apparatus, whereby the remaining lifetime of components in the HVAC apparatus can be predicted in advance to enhance management efficiency.

Accordingly, the present invention provides a heating, ventilation and air conditioning (HVAC) apparatus with alerting function for component efficacy declining, the HVAC apparatus comprising: a fan arranged at an air outlet; a filter arranged between an air inlet and the air outlet; a pressure-difference transmitter arranged at two sides of the filter and sensing a current pressure difference between the two sides of the filter; a memory unit recording a target pressure-difference condition, a first pressure-difference condition and second pressure-difference condition, wherein the second pressure-difference condition is smaller than the target pressure-difference condition and the first pressure-difference condition is smaller than the second pressure-difference condition; a processor operatively connected to the fan, the pressure-difference transmitter and the memory unit.

The processor is configured to continually record a working time of the fan and the current pressure difference, the processor being configured to calculate a first stage slope based on the first pressure-difference condition, an initial pressure difference and the working time of the fan when the current pressure difference reaches the first pressure-difference condition, the processor being configured to calculate a second stage slope based on the second pressure-difference condition, the first pressure-difference condition, and the working time of the fan when the current pressure difference reaches the first pressure-difference condition. The processor is configured to use the first stage slope as a base slope to estimate a predicted remaining lifetime for the current pressure difference to reach the target pressure-difference condition when the comparison result is smaller than or equal to a preset threshold; and to use the second stage slope as the base slope to estimate the predicted remaining lifetime for the current pressure difference to reach the target pressure-difference condition when the comparison result is larger than the preset threshold.

Accordingly, the present invention provides a method for alerting component efficacy declining of heating, ventilation and air conditioning (HVAC) apparatus. The method includes: obtaining a target pressure-difference condition for the HVAC apparatus and calculating a first pressure-difference condition and a second pressure-difference condition based on the target pressure-difference condition, wherein the second pressure-difference condition is smaller than the target pressure-difference condition and the first pressure-difference condition is smaller than the second pressure-difference condition; controlling the HVAC apparatus to operate, continually recording a working time of the fan and continually calculating a current pressure difference by the pressure-difference transmitter; calculating a first stage slope based on the first pressure-difference condition, an initial pressure difference and the working time of the fan when the current pressure difference reaches the first pressure-difference condition; calculating a second stage slope based on the second pressure-difference condition, the first pressure-difference condition, and the working time of the fan when the current pressure difference reaches the second pressure-difference condition; comparing the first stage slope and the second stage slope to generate a comparison result; using the first stage slope as a base slope to estimate a predicted remaining lifetime for the current pressure difference to reach the target pressure-difference condition when the comparison result is smaller than or equal to a preset threshold; and using the second stage slope as the base slope to estimate the predicted remaining lifetime for the current pressure difference to reach the target pressure-difference condition when the comparison result is larger than the preset threshold.

By the present invention, the remaining lifetime of part of the components in the HVAC apparatus can be predicted based on a plurality of working data of the HVAC apparatus. The management staff may precisely organize the maintenance schedules in advance and arrange the purchase and storage of the spare parts. The management efficiency can be enhanced and the management cost can be optimized.

DETAILED DESCRIPTION OF THE INVENTION

Reference will now be made to the drawing figures to describe the present disclosure in detail. It will be understood that the drawing figures and exemplified example of present disclosure are not limited to the details thereof.

Figure 1:
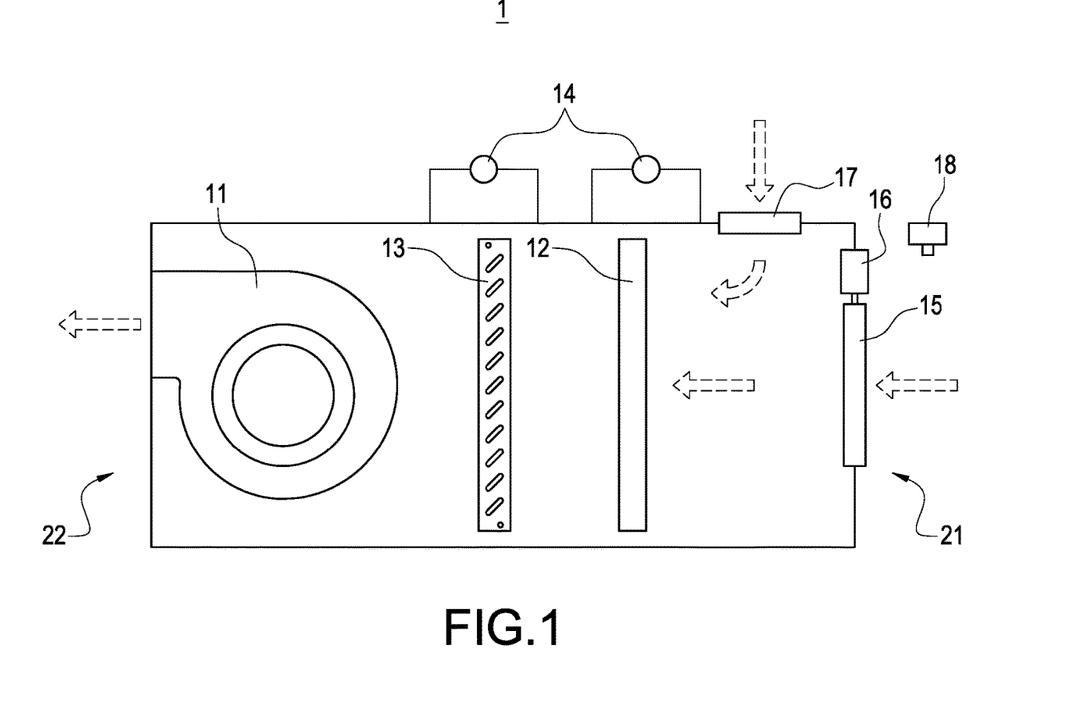
FIG. 1 shows the internal structure of the HVAC apparatus according to the first embodiment of the present invention.
Figure 2:
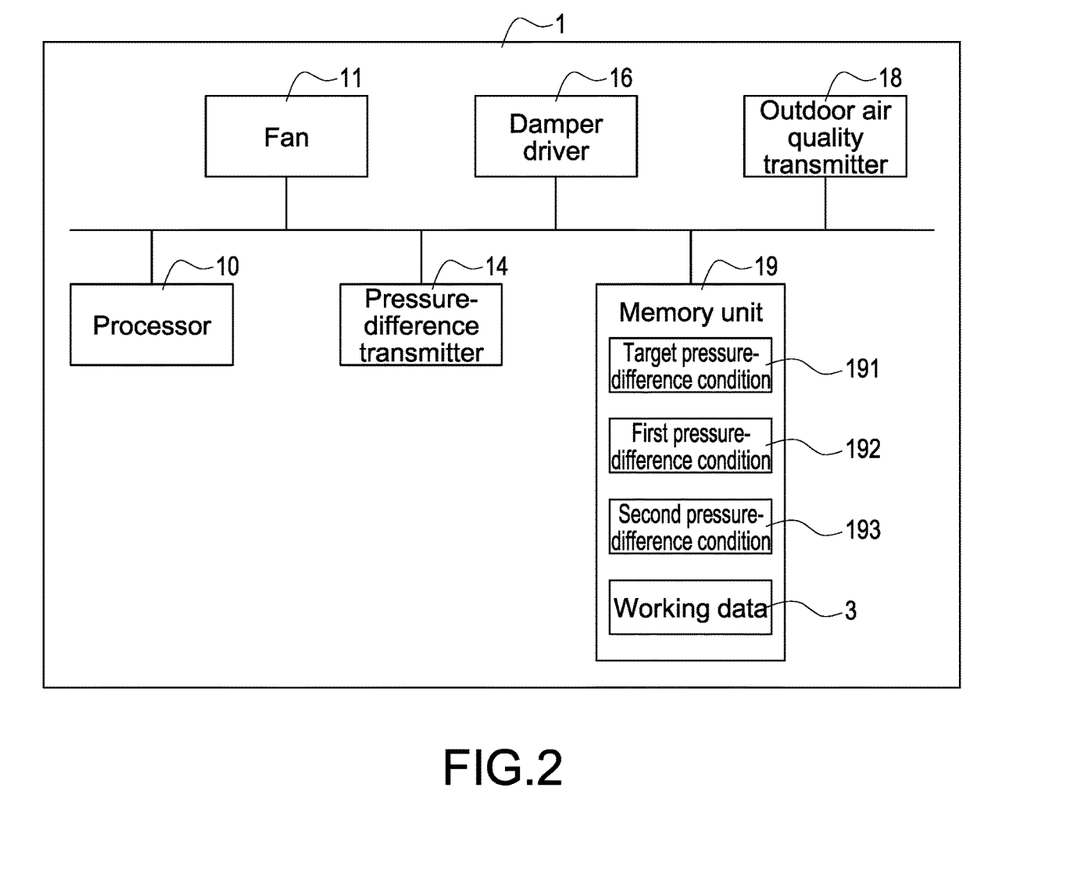
FIG. 2 shows the block diagram of the HVAC apparatus according to the first embodiment of the present invention.

FIG. 1 shows the internal structure of the heating, ventilation and air conditioning apparatus (hereinafter, briefed as HVAC apparatus) according to the first embodiment of the present invention. FIG. 2 shows the block diagram of the HVAC apparatus according to the first embodiment of the present invention.

FIGS. 1 and 2 shows the HVAC apparatus 1 with alerting function of component efficacy declining (hereinafter, briefed as HVAC apparatus 1). The HVAC apparatus 1 continually records working data during operation and predicts the performance-decline condition (namely, the remaining lifetime) of part of components in the HVAC apparatus 1. Therefore, management staff may arrange maintenance schedules before the remaining lifetime ends and prepare the spare parts to enhance management efficiency and optimize management cost.

As shown in FIG. 1, the HVAC apparatus 1 has an air inlet 21 at one end thereof and an air outlet 22 at another end thereof, and the HVAC 1 further has fan 11 near the air outlet 22, a filter 12 arranged between the air inlet 21 and the air outlet 22, and pressure-difference transmitters 14 arranged at the front side and the back side of the filter 12.

In the present invention, the HVAC apparatus 1 sucks air from the air inlet 21, removes pollutant from the air by the filter 12 and then sends the filtered air to indoor space through the air outlet 22 by the operation of the fan 11. The pressure-difference transmitters 14 continually sense the pressures at the front side and the back side of the filter 12 to calculate the current pressure difference. The current pressure difference increases when the filter 12 is gradually clogged with accumulated pollutant. One of the technology aspects of the present invention is that the HVAC apparatus 1 calculates the clogging of the filter 12 and then predicts the efficacy declining condition (namely the remaining lifetime) of the filter 12 with reference to the current pressure difference and the working time of the fan 11. Therefore, the management staff can arrange the maintenance schedules of the filter 12 in advance.

As shown in FIG. 2, the HVAC apparatus 1 of the present invention mainly comprises a processor 10, where the fan 11 and the pressure-difference transmitters 14 are electrically connected to the processor 10 respectively. The HVAC apparatus 1 further comprises a memory unit (computer storage unit) 19 electrically connected to the processor 10, and the memory unit 19 at least stores a target pressure-difference condition 191, a first pressure-difference condition 192 and a second pressure-difference condition 193 for the HVAC apparatus 1.

Even for a brand new filter 12, a certain pressure difference is present at the front side and the back side of the filter 12 (for example, the pressure difference is 50 Pa), and this pressure difference is referred to as initial pressure difference. One of the objects of the present invention is that the processor 10 automatically calculates and predicts the predicted remaining lifetime of the filter 12 before the actual change time of the filter 12 is up. Therefore, the management staff of the HVAC apparatus 1 may set a target pressure-difference condition 191 (such as 150 Pa), and the processor 10 automatically determines that the filter 12 needs to be cleaned or changed when the current pressure difference reaches the target pressure-difference condition 191.

In one embodiment, the HVAC apparatus 1 further calculates the first pressure-difference condition 192 and the second pressure-difference condition 193 based on the initial pressure difference and the target pressure-difference condition 191, where the second pressure-difference condition 193 is smaller than the target pressure-difference condition 191 and the first pressure-difference condition 192 is smaller than the second pressure-difference condition 193 such that the first pressure-difference condition 192 and the second pressure-difference condition 193 may be used as determination base for different stages, which will be detailed later.

In the present invention, the processor 10 continually records the working time of the fan 11 when the HVAC apparatus 1 operates and continually controls the pressure-difference transmitters 14 to calculate and record the current pressure difference between two sides (the front and the back sides) of the filter 12. When maintenance of the HVAC apparatus 1 is being performed, the above pressure difference is equal to or similar to the initial pressure difference (such as 50 Pa).

When the processor 10 determines that the current pressure difference calculated by the pressure-difference transmitters 14 reaches the first pressure-difference condition 192 (such as 80 Pa), the processor 10 calculates a first stage slope based on the first pressure-difference condition 192, the initial pressure difference and the current working time of the fan 11. More particularly, the processor 10 calculates the first stage slope with following formula:

$$S1 = \frac{(P_1 - P_i)}{T_1},$$

where S1 is the first stage slope, $P_1$ is the first pressure-difference condition 192, $P_i$ is the initial pressure difference, and $T_1$ is working time of the fan 11 from the start of the HVAC apparatus 1 to the time when the current pressure difference reaches the first pressure-difference condition 192.

It should be noted that the processor 10 may also record other working data 3 of the HVAC apparatus 1 and store the other working data of the HVAC apparatus 1 in memory unit 19 besides storing the working time of the fan 11 and the current pressure difference, which will be detailed later.

Afterward, the processor 10 continually receives the current pressure difference calculated by the pressure-difference transmitters 14. The processor 10 calculates a second stage slope based on the second pressure-difference condition 193, the first pressure-difference condition 192, and the current working time of the fan 11 when the current pressure difference reaches the second pressure-difference condition 193 (such as 110 Pa). More particularly, the processor 10 calculates the second stage slope with following formula $$S2 = \frac{(P_2 - P_1)}{(T_2 - T_1)},$$

where S2 is the second stage slope, $P_2$ is the second pressure-difference condition 193, $P_1$ is the first pressure-difference condition 192, $T_1$ is working time of the fan 11 from the start of the HVAC apparatus 1 to the time when the current pressure difference reaches the first pressure-difference condition 192, $T_2$ is working time of the fan 11 from the start of the HVAC apparatus 1 to the time when the current pressure difference reaches the second pressure-difference condition 193.

In the present invention, the processor 10 calculates the first stage slope (such as the first stage slope 41 shown in FIG. 4) when the current pressure difference reaches the first pressure-difference condition 192, calculates the second stage slope (such as the second stage slope 42 shown in FIG. 4) when the current pressure difference reaches the second pressure-difference condition 193, and compares the first stage slope 41 with the second stage slope 42 to obtain a comparison result. The processor 10 further determines whether the first stage slope 41 and the second stage slope 42 are similar based on the comparison result.

Figure 4:
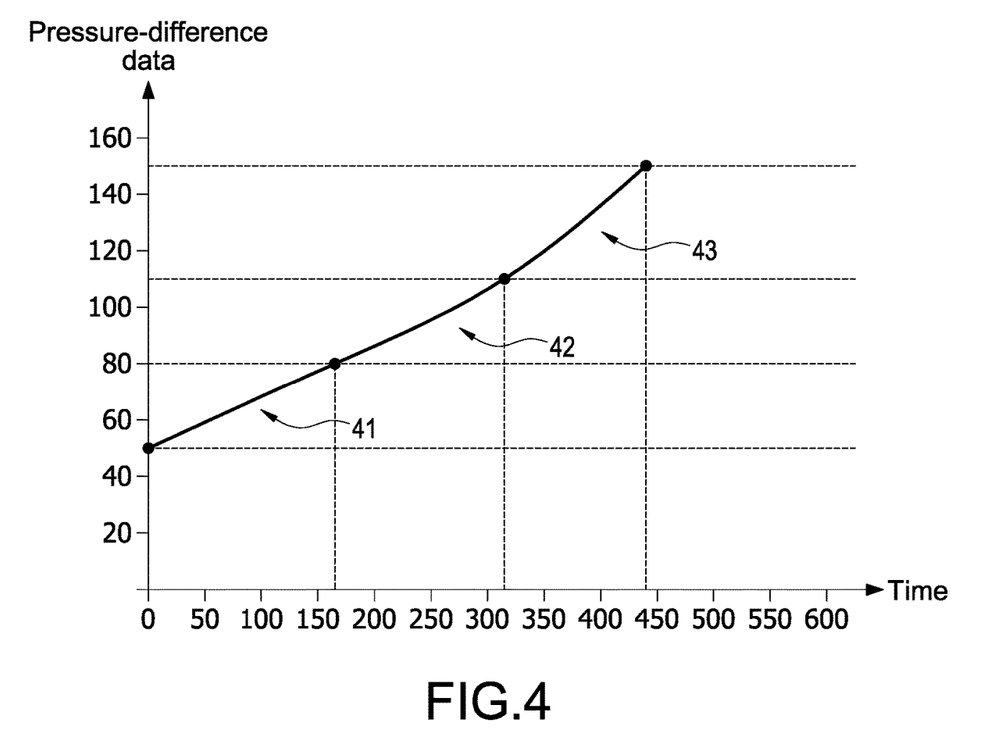
FIG. 4 shows the exemplary slope according to the first embodiment.

In one embodiment, the processor 10 determines that the first stage slope 41 and the second stage slope 42 are similar when the comparison result between the first stage slope 41 and the second stage slope 42 is equal to or smaller than a preset threshold, namely, the working condition of the HVAC apparatus 1 and the air quality do not have drastic change with time. On the contrary, the processor 10 determines that the first stage slope 41 and the second stage slope 42 are not similar when the comparison result between the first stage slope 41 and the second stage slope 42 is larger than the preset threshold, namely, the working condition of the HVAC apparatus 1 or the air quality have drastic change during this time period.

For example, the preset threshold may be smaller than or equal to 8% (hereinafter taking 5% for example); this means that the processor 10 determines that the first stage slope 41 and the second stage slope 42 are similar when the difference between the first stage slope 41 and the second stage slope 42 is smaller than or equal to ±5%.

When the processor 10 determines that the first stage slope 41 and the second stage slope 42 are similar (namely, the comparison result between the first stage slope 41 and the second stage slope 42 is equal to or smaller than the preset threshold), the processor 10 sets the first stage slope 41 as base slope and predicts the remaining lifetime, namely the time left before the current pressure difference reaches the target pressure-difference condition 191, based on the base slope. On the other hand, when the processor 10 determines that the first stage slope 41 and the second stage slope 42 are not similar (namely, the comparison result between the first stage slope 41 and the second stage slope 42 is larger than the preset threshold), the processor 10 sets the second stage slope 42 as base slope and predicts the remaining lifetime, namely the time left before the current pressure difference reaches the target pressure-difference condition 191, based on the base slope.

More particularly, after determining the base slope, the processor 10 may predict the remaining lifetime based on following formula:

$$Tp = \frac{P_d - P_2}{S_S},$$

where $T_P$ is the predicted remaining lifetime, $P_d$ is the target pressure-difference condition 191, $P_2$ is the second pressure-difference condition 193 (refers to the current pressure difference at this moment), and $S_S$ is the base slope.

The target pressure-difference condition 191 may be set by the management staff and is, for example, 150 Pa. The initial pressure difference is varied based on the quality and type of the filter 12 and is, for example, 50 Pa. In one embodiment, the HVAC apparatus 1 may automatically generate, based on preset adjusting coefficient, the first pressure-difference condition 192 representing the first stage and the second pressure-difference condition 193 representing the second stage.

In one embodiment, the HVAC apparatus 1 may preset a first adjusting coefficient (such as 0.2) and a second adjusting coefficient (such as 0.4), where the second adjusting coefficient is a multiple of the first adjusting coefficient. Based on the above first adjusting coefficient and second adjusting coefficient, the processor 10 automatically calculates the first pressure-difference condition 192 based on the first calculation formula below, and calculates the second pressure-difference condition 193 based on the second calculation formula below.

First calculation formula: the first pressure-difference condition 192=initial pressure difference+(the target pressure-difference condition 191×the first adjusting coefficient).

Second calculation formula: the second pressure-difference condition 193=initial pressure difference+(the target pressure-difference condition 191×the second adjusting coefficient).

For example, provided that the initial pressure difference is 50 Pa, the target pressure-difference condition 191 is 150 Pa, the first adjusting coefficient is 0.2, the second adjusting coefficient is 0.4; then the first pressure-difference condition 192 is 50 Pa+(150 Pa×0.2)=80 Pa, and the second pressure-difference condition 193 is 50 Pa+(150 Pa×0.4)=110 Pa. However, the above example is only for demonstration and is not limitation for the present invention.

Figure 3:
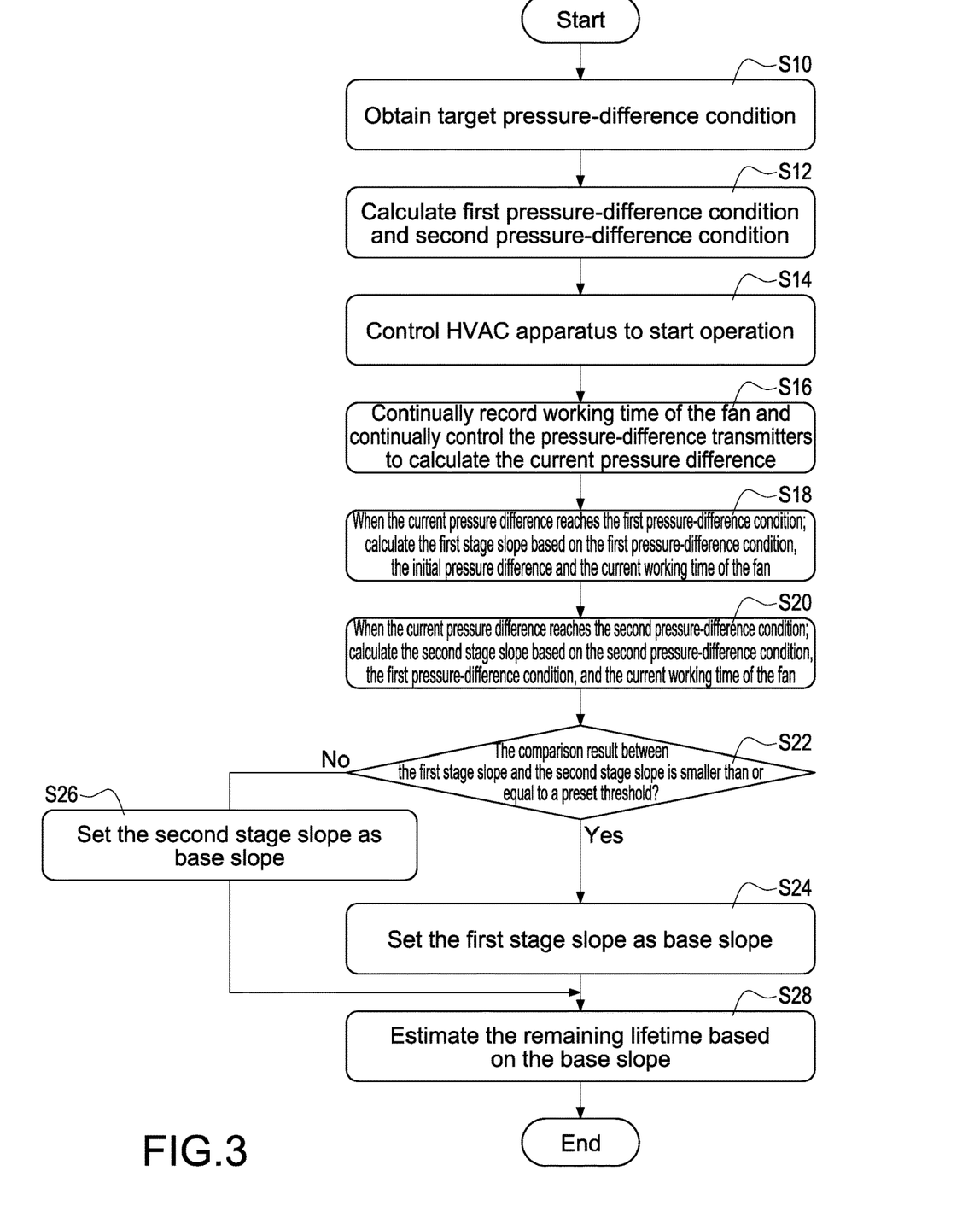
FIG. 3 is the flowchart of the alerting method according to the first embodiment of the present invention.

FIG. 3 is the flowchart of the alerting method according to the first embodiment of the present invention. FIG. 3 shows the steps of the alerting method for component efficacy declining in HVAC apparatus (hereinafter, the alerting method) according to the first embodiment of the present invention and the alerting method can be applied to the HVAC apparatus 1 shown in FIGS. 1 and 2.

At first, the processor 10 of the HVAC apparatus 1 obtains the target pressure-difference condition 191 set by the management staff (step S10) and then calculates the first pressure-difference condition 192 and the second pressure-difference condition 193 based on the target pressure-difference condition 191, the initial pressure difference, the first adjusting coefficient and the second adjusting coefficient (step S12). In another embodiment, the target pressure-difference condition 191, the first pressure-difference condition 192 and the second pressure-difference condition 193 may also be set when the HVAC apparatus 1 is manufactured to save the labor of setting by management staff and enhance the usage convenience.

Afterward, the processor 10 controls the HVAC apparatus 1 to start operation (step S14). The processor 10 continually records the working time of the fan 11 during operation of the HVAC apparatus 1 and continually controls the pressure-difference transmitters 14 to calculate and record the current pressure difference (step S16).

In this embodiment, the current pressure difference is, for example but not limited to, the pressure difference between two sides (the front and the back sides) of the filter 12. As shown in FIG. 1, the HVAC apparatus 1 may also include heat-exchange coil 13 for air cooling or heating. Pollutant may be accumulated on the heat-exchange coil 13 because air needs to flow through the heat-exchange coil 13 for cooling or heating. Therefore, the heat-exchange coil 13 also has component efficacy declining problem. In another embodiment, the pressure-difference transmitters 14 may also be arranged at the front side and the back side of the heat-exchange coil 13. Therefore, in that embodiment, the current pressure difference is the pressure difference between two sides (the front and the back sides) of the heat-exchange coil 13.

For the sake of demonstration, the below example is exemplified with pressure difference between two sides (the front and the back sides) of the filter 12.

It should be noted that in the step S16, the processor 10 also records the other working data 3 such as opening time of outdoordamper 15, the opening degree of the outdoor damper 15, the outdoor air quality and the returning air quality and so on to provide more precise prediction for the remaining lifetime.

After the HVAC apparatus 1 starts operating, the processor 10 continually monitors the current pressure difference. When the processor 10 determines that the current pressure difference calculated by the pressure-difference transmitters 14 reaches the first pressure-difference condition 192, the processor 10 calculates the first stage slope 41 based on the first pressure-difference condition 192, the initial pressure difference and the current working time of the fan 11 (step S18). In step S18, the working time of the fan 11 is the accumulated working time from the start of the HVAC apparatus 1 to the time when the current pressure difference reaches the first pressure-difference condition 192.

After the current pressure difference reaches the first pressure-difference condition 192, the processor 10 still continually monitors the current pressure difference. When the processor 10 determines that the current pressure difference calculated by the pressure-difference transmitters 14 reaches the second pressure-difference condition 193, the processor 10 calculates the second stage slope 42 based on the second pressure-difference condition 193, the first pressure-difference condition 192, and the current working time of the fan 11 (step S20). In step S20, the working time of the fan 11 is the time elapsed between the time when the current pressure difference reaches the first pressure-difference condition 192 and the time when the current pressure difference reaches the second pressure-difference condition 193.

After calculating the first stage slope 41 and the second stage slope 42, the processor 10 compares the first stage slope 41 and the second stage slope 42 to determine whether the comparison result is smaller than or equal to a preset threshold (step S22). The processor 10 sets the first stage slope 41 as base slope when the comparison result is smaller than or equal to the preset threshold (step S24). The processor 10 sets the second stage slope 42 as base slope when the comparison result is larger than the preset threshold (step S26).

Finally, the processor 10 conducts calculation based on the base slope (the first stage slope 41 or the second stage slope 42) to estimate the remaining lifetime for the current pressure difference to reach the target pressure-difference condition 191 (step S28).

Refer also to FIG. 4, this figure shows the exemplary slope according to the first embodiment. In FIG. 4, initial pressure difference of 50 Pa, the first pressure-difference condition 192 of 80 Pa, the second pressure-difference condition 193 of 110 Pa and the target pressure-difference condition 191 of 150 Pa are taken as examples.

As shown in FIG. 4, when the HVAC apparatus 1 starts to operate, the processor 10 continually monitors the pressure difference between the front side and the back side of the filter 12 and/or the pressure difference between the front side and the back side of the heat-exchange coil 13 (namely, the current pressure difference) and calculates the accumulated working time of the fan 11 from the time when the current pressure difference is the initial pressure difference to the time when the current pressure difference is the first pressure-difference condition 192. The processor 10 then calculates the first stage slope 41 based on the first pressure-difference condition 192, the initial pressure difference and the working time of the fan 11.

Besides, the current pressure difference increases as the pollutant is increasingly accumulated at the filter 12 and/or the heat-exchange coil 13. The processor 10 also calculates the time elapsed between the time when the current pressure difference is the first pressure-difference condition 192 and the time when the current pressure difference is the second pressure-difference condition 193. Then the processor 10 calculates the second stage slope 42 based on the second pressure-difference condition 193, the first pressure-difference condition 192, and the working time of the fan 11.

As mentioned above, if the first stage slope 41 is similar to the second stage slope 42, it means that the operation condition of the HVAC apparatus 1 and the air quality do not have significant change, the processor 10 directly uses the first stage slope 41 to predict the remaining lifetime for the current pressure difference to reach the target pressure-difference condition 191. Alternatively, the processor 10 may also use the second stage slope 42 to predict the remaining lifetime due to the similarity between the first stage slope 41 and the second stage slope 42. On the contrary, if the first stage slope 41 is not similar to the second stage slope 42, the processor 10 uses the second stage slope 42 to predict the remaining lifetime.

More specifically, the present invention uses the alerting method shown in FIG. 3 to calculate and display the remaining lifetime when the current pressure difference reaches the second pressure-difference condition 193 such that the management staff is aware of the component efficacy declining (namely, the remaining lifetime of the filter 12 and the heat-exchange coil 13). At this moment, there is still time before the current pressure difference reaches the target pressure-difference condition 191 such that the management staff has enough time to arrange the maintenance schedules for the filter 12 and the heat-exchange coil 13 in advance.

It should be noted that the HVAC apparatus 1 still needs certain operation time before the current pressure difference reaches the target pressure-difference condition 191. During this operation time, the operation condition of the HVAC apparatus 1 and air quality may have drastic change such that the remaining lifetime predicted with reference to the first stage slope 41 and the second stage slope 42 may be inaccurate. Accordingly, the present invention provides a third stage of dynamic prediction procedure, which will be detailed later.

As shown in FIGS. 1 and 2, the HVAC apparatus 1 of the present invention also includes an outdoor damper 15 arranged near the air inlet 21 and allowing the outdoor air to enter the HVAC apparatus 1, and a damper driver 16 electrically connected to the processor 10 and the outdoor damper 15 to control the opening and closing of the outdoor damper 15 and the opening degree (large, medium and small opening degree) of the outdoor damper 15. The opening time and the opening degree of the outdoor damper 15 greatly influences the amount of outdoor air flowing into the HVAC apparatus 1; therefore, after the HVAC apparatus 1 starts operation, the processor 10 continually records the opening time and the opening degree of the outdoor damper 15 (for example, this continual recording is performed in the step S16 shown in FIG. 3) and the processor 10 stores the opening time and the opening degree of the outdoor damper 15 in the memory unit 19 as part of the working data 3.

Besides, the HVAC apparatus 1 of the present invention also includes an outdoor air quality transmitter 18 arranged outside the HVAC apparatus 1 and in communication with the processor 10 (operatively connected to the processor 10). The outdoor air quality greatly impacts the dirty level of the outdoor air flowing into the HVAC apparatus 1. After the HVAC apparatus 1 starts operation, the processor 10 continually records the outdoor air quality detected and sent by the outdoor air quality transmitter 18 (for example, this continual recording is performed in the step S16 shown in FIG. 3) and the processor 10 stores the outdoor air quality in the memory unit 19 as part of the working data 3.

Figure 5:
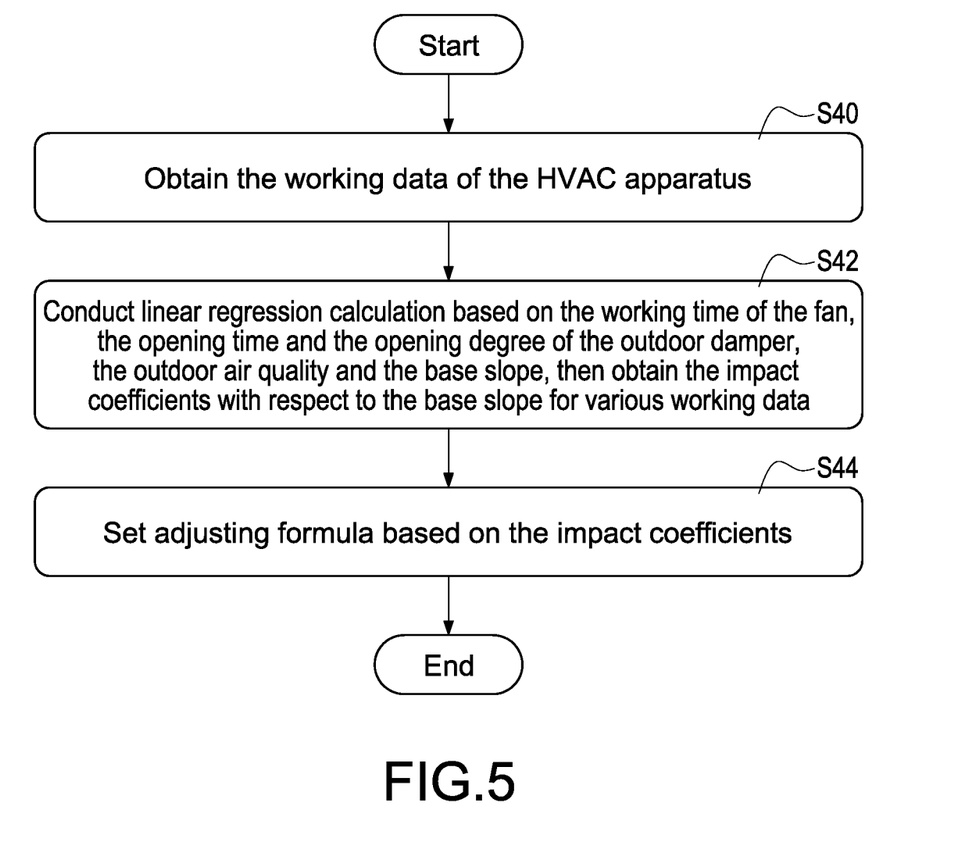
FIG. 5 shows the flowchart for establishing the slope adjusting formula according to the first embodiment of the present invention.

Refer also to FIG. 5, this figure shows the flowchart for establishing the slope adjusting formula according to the first embodiment of the present invention.

In the present invention, after the HVAC apparatus 1 starts operation, the processor 10 continually records the working data 3 (such as the working time of the fan 11, the opening time and the opening degree of the outdoor damper 15 and the outdoor air quality) into log file of the memory unit 19. When the current pressure difference reaches the second pressure-difference condition 193 and the processor 10 predicts/displays the remaining lifetime, the processor 10 may further read the working data 3 such as the working time of the fan 11, the opening time and the opening degree of the outdoor damper 15 and the outdoor air quality from the memory unit 19 (step S40) and use the working data 3 as base for calculating dynamic slope 43 shown in FIG. 4.

More particularly, the processor 10 conducts linear regression calculation based on the working time of the fan 11, the opening time and the opening degree of the outdoor damper 15, the outdoor air quality and the base slope determined in the step S28 of FIG. 3 and then obtains the first impact coefficient (depending on the working time of the fan 11), the second impact coefficient (depending on the opening time of the outdoor damper 15), the third impact coefficient (depending on the opening degree of the outdoor damper 15), the fourth impact coefficient (depending on the outdoor air quality) with respect to the base slope (step S42). In this embodiment, the first impact coefficient, the second impact coefficient, the third impact coefficient and the fourth impact coefficient are constant coefficients.

After step S42, the processors 10 establishes an adjusting formula based on the first impact coefficient, the second impact coefficient, the third impact coefficient and the fourth impact coefficient (step S44). In one embodiment, the adjusting formula is a linear equation and used to generate the dynamic slope 43 based on the working data 3 of the HVAC apparatus 1. Therefore, the processor 10 may continually update the predicted remaining lifetime of the component (such as the filter 12 or the heat-exchange coil 13) based on the dynamic slope 43 before the current pressure difference reaches the target pressure-difference condition 191.

In one embodiment, the adjusting formula is for example: $S=a_0+a_1W+a_2X+a_3Y+a_4Z$, where S is the dynamic slope 43, $a_0$ is error coefficient, $a_1$ is the first impact coefficient, W is the daily accumulated working time of the fan 11, $a_2$ is the second impact coefficient, X is the daily accumulated opening time of the outdoor damper 15, $a_3$ is the third impact coefficient, Y is the daily average of opening degree of the outdoor damper 15, $a_4$ is the fourth impact coefficient, and Z is the daily average of outdoor air quality.

More particularly, the first impact coefficient, the second impact coefficient, the third impact coefficient and the fourth impact coefficient are respectively weighting factors for the daily accumulated working time of the fan 11, the daily accumulated opening time of the outdoor damper 15, the daily average of opening degree of the outdoor damper 15 and the daily averaged outdoor air quality with respect to the dynamic slope 43. The processor 10 obtains the daily accumulated working time of the fan 11, the daily accumulated opening time of the outdoor damper 15, the daily average of opening degree of the outdoor damper 15 and the daily average of outdoor air quality, and applies those data to the adjusting formula to calculate the daily-based (namely for 24 hours) dynamic slope 43.

It should be noted that, as shown in FIG. 1, the HVAC apparatus 1 may include a returning damper 17 near the air inlet 21. The returning damper 17 allows the indoor air to flow back to the HVAC apparatus 1. The returning air is filtered by the filter 12 and is cooled/heated by the heat-exchange coil 13 and then flows again into indoor space through the air outlet 22 by the operation of the fan 11. In one embodiment, the HVAC apparatus 1 may include an indoor air quality transmitter (not shown) near the returning damper 17. The indoor air quality transmitter is in communication with (operatively connected to) the processor 10 to sense the air quality for the returning air.

In this embodiment, the processor 10 continually records the air quality for the returning air during operation of the HVAC apparatus 1 and uses the air quality for the returning air as part of the working data 3. In this embodiment, the adjusting formula is $S=a_0+a_1W+a_2X+a_3Y+a_4Z+a_5R$, where $a_5$ is the fifth impact coefficient counting the impact of the returning air quality to the base slope and R is the daily average of the returning air quality. In other word, the processor 10 also uses other working data for the calculation of the dynamic slope 43 besides using the accumulated working time of the fan 11, the accumulated opening time of the outdoor damper 15, the accumulated opening degree of the outdoor damper 15, and the averaged outdoor air quality. Therefore, the prediction of the remaining lifetime for the filter 12 and the heat-exchange coil 13 can be more precisely made.

Figure 6:
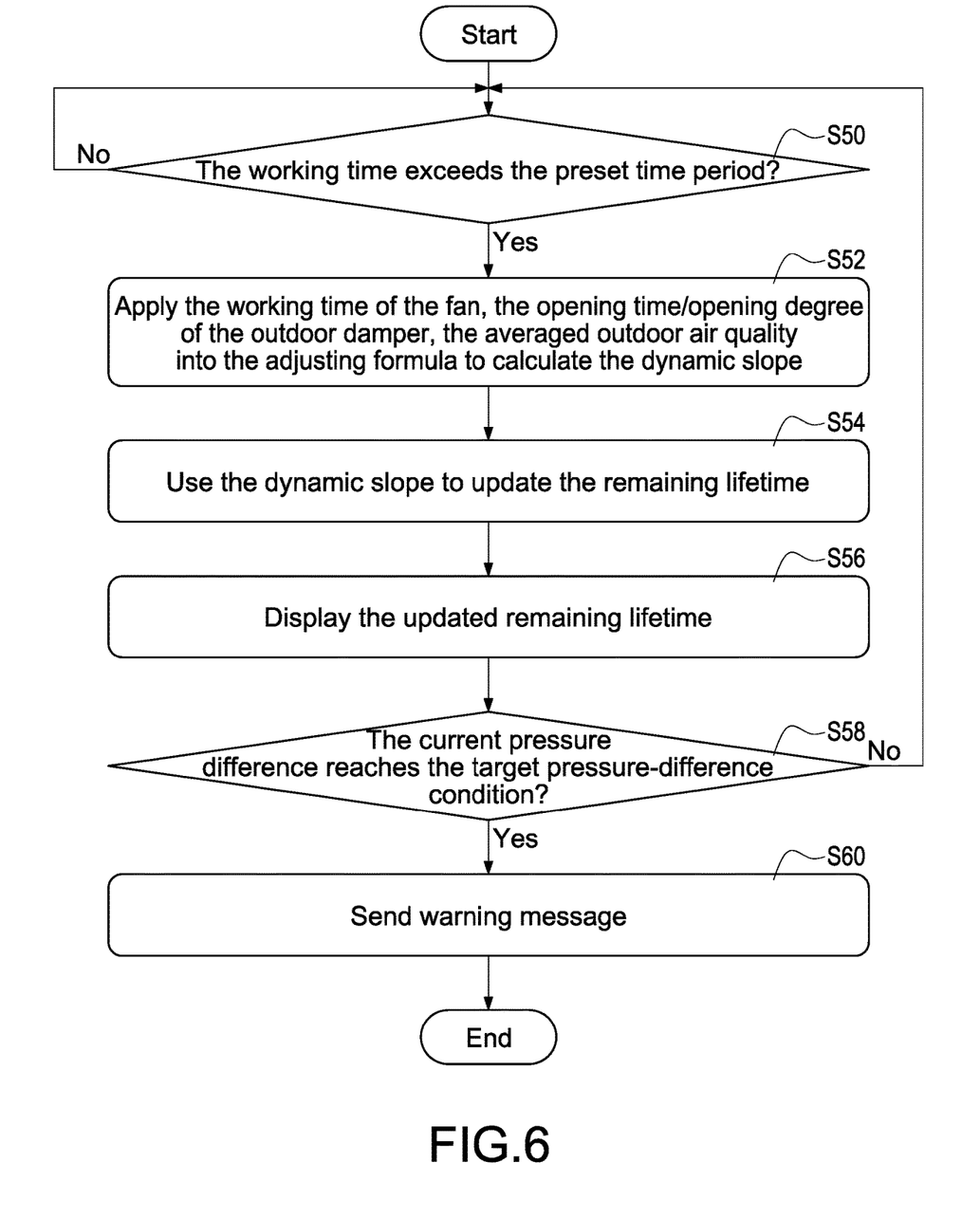
FIG. 6 is the flowchart of the alerting method according to the second embodiment of the present invention.

Refer also to FIG. 6, this figure shows the alerting method according to the second embodiment of the present invention. In this embodiment, the processor 10 starts to calculate the working time of the HVAC apparatus 1 after the current pressure difference reaches the second pressure-difference condition 193 and determines whether the working time exceeds the preset time period (step S50). In one embodiment, the preset time period can be set in terms of hour (such as 168 hours), in terms of day (such as 10 days) or in terms of month (such as one month) and above example is not limitation for the present invention. Besides, if the working time does not exceed the preset time period, the processor 10 returns to step S50 to keep recording the working data 3 of the HVAC apparatus 1 and calculating the working time.

After the working time exceeds the preset time period, the processor 10 reads all working data 3 from the memory unit 19 and calculates the daily accumulated working time of the fan 11, the daily accumulated opening time of the outdoor damper 15, the daily average of opening degree of the outdoor damper 15, and the daily average of outdoor air quality. Then the processor 10 applies the daily accumulated working time of the fan 11, the daily accumulated opening time of the outdoor damper 15, the daily average of opening degree of the outdoor damper 15, and the daily average of outdoor air quality into the adjusting formula to calculate the dynamic slope 43 (step S52).

After step S52, the processor 10 may use the dynamic slope 43 to update the remaining lifetime (step S54). More particularly, the processor 10 uses following formula to calculate the remaining lifetime $$T_p = \frac{(P_d - P_c)}{S},$$

where $T_p$ is the remaining lifetime, S is the dynamic slope 43, $P_d$ is the target pressure-difference condition 191 and Pc is the current pressure difference.

After step S54, the processor 10 further displays the updated remaining lifetime on the display (not shown) of the HVAC apparatus 1, or sends the updated remaining lifetime to external electronic device for display (step S56). Therefore, the management staff can be aware of the current efficacy declining of the filter 12 and the heat-exchange coil 13 and can arrange the maintenance task in advance.

Besides, after updating the predicted remaining lifetime, the processor 10 may reset the working time of the HVAC apparatus 1 to zero to calculate the time point at which the predicted remaining lifetime needs to update.

In the present invention, the processor 10 continually determines whether the current pressure difference reaches the target pressure-difference condition 191 (step S58) and performs steps S50 to S56 before the current pressure difference reaches the target pressure-difference condition 191 such that the processor 10 can update the predicted remaining lifetime for the filter 12 and the heat-exchange coil 13 after each preset time period.

It should be noted that if the management staff already performs maintenance for the filter 12 and the heat-exchange coil 13 (such as using a new filter 12 or cleaning the heat-exchange coil 13) before the current pressure difference reaches the target pressure-difference condition 191, the current pressure difference calculated by the pressure-difference transmitters 14 will be greatly reduced (such as reducing to be equal to or similar to the initial pressure difference). At this time, the processor 10 may return its procedure to the alerting method shown in FIG. 3 to recalculate the first stage slope 41 and the second stage slope 42, and then re-estimate the predicted remaining lifetime for the filter 12 and the heat-exchange coil 13 based on the base slope.

On the contrary, if the management staff does not perform maintenance for the target component (such as the filter 12 and the heat-exchange coil 13) after the current pressure difference reaches the target pressure-difference condition 191, the processor 10 will send a warning message (step S60) through the built-in display, loudspeaker or external electronic device to inform the management staff to perform maintenance in time.

By the present invention, the management staff may be well aware of the component efficacy declining of the HVAC apparatus 1 and can arrange the maintenance schedules in advance as well as arrange the purchase and storage of the spare parts. The management efficiency can be enhanced and the management cost can be optimized.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A method for alerting component efficacy declining of heating, ventilation and air conditioning (HVAC) apparatus, the method applied to an HVAC apparatus at least having a fan, a filter and a pressure-difference transmitter for sensing pressure difference at two sides of the filter, the method comprising:

a) obtaining a target pressure-difference condition for the HVAC apparatus and calculating a first pressure-difference condition and a second pressure-difference condition based on the target pressure-difference condition, wherein the second pressure-difference condition is smaller than the target pressure-difference condition and the first pressure-difference condition is smaller than the second pressure-difference condition;

b) controlling the HVAC apparatus to operate, continually recording a working time of the fan and continually calculating a current pressure difference by the pressure-difference transmitter;

c) calculating a first stage slope based on the first pressure-difference condition, an initial pressure difference and the working time of the fan when the current pressure difference reaches the first pressure-difference condition;

d) calculating a second stage slope based on the second pressure-difference condition, the first pressure-difference condition, and the working time of the fan when the current pressure difference reaches the second pressure-difference condition;

e) comparing the first stage slope and the second stage slope to generate a comparison result;

f) using the first stage slope as a base slope to estimate a predicted remaining lifetime for the current pressure difference to reach the target pressure-difference condition when the comparison result is smaller than or equal to a preset threshold; and g) using the second stage slope as the base slope to estimate the predicted remaining lifetime for the current pressure difference to reach the target pressure-difference condition when the comparison result is larger than the preset threshold.

2. The method in claim 1, wherein in step a) the first pressure-difference condition is calculated based on a first calculation formula, and the second pressure-difference condition is calculated based on a second calculation formula;

wherein the first calculation formula is: the first pressure-difference condition=the initial pressure difference+ (the target pressure-difference condition×a first adjusting coefficient);

the second calculation formula is: the second pressure-difference condition=the initial pressure difference+ (the target pressure-difference condition×a second adjusting coefficient), wherein the second adjusting coefficient is multiple of the first adjusting coefficient.

3. The method in claim 1, wherein the preset threshold is smaller than 8%.

4. The method in claim 3, wherein the preset threshold is 5%.

5. The method in claim 1, wherein the target pressure-difference condition is 150 Pa.

6. The method in claim 1, wherein the HVAC apparatus further comprises an outdoor damper allowing outdoor air to flow into the HVAC apparatus, a damper driver to control an opening and an opening degree of the outdoor damper, and an outdoor air quality transmitter for sensing an outdoor air quality for air outside the HVAC apparatus, wherein in the step b) an opening time of the outdoor damper, the opening degree of the outdoor damper and the outdoor air quality are continually recorded.

7. The method in claim 6, further comprising following steps:
  h) obtaining the working time of the fan, the opening time of the outdoor damper, the opening degree of the outdoor damper and the outdoor air quality before the current pressure difference reaches the second pressure-difference condition;
  i) performing a linear regression calculation based on the working time of the fan, the opening time of the outdoor damper, the opening degree of the outdoor damper, the outdoor air quality and the base slope; and
  j) based on a result of the linear regression calculation, generating a first impact coefficient depending on the working time of the fan, a second impact coefficient depending on the opening time of the outdoor damper, a third impact coefficient depending on the opening degree of the outdoor damper, and a fourth impact coefficient depending on the outdoor air quality, wherein the first impact coefficient, the second impact coefficient, the third impact coefficient and the fourth impact coefficient are constant coefficients with respect to the base slope.

8. The method in claim 7, further comprising following steps:
  k) determining whether a preset time period elapses;
  l) generating a dynamic slope based on an adjusting formula when the preset time period elapses; and
  m) updating the remaining lifetime based on the dynamic slope;
  wherein the adjusting formula is: $S=a_0\,a_1W+a_2X+a_3Y+a_4Z$, S is the dynamic slope, $a_0$ is error coefficient, $a_1$ is the first impact coefficient, W is a daily accumulated working time of the fan, $a_2$ is the second impact coefficient, X is a daily accumulated opening time of the outdoor damper, $a_3$ is the third impact coefficient, Y is a daily average of opening degree of the outdoor damper, $a_4$ is the fourth third impact coefficient, and Z is a daily average of outdoor air quality.

9. The method in claim 8, further comprising following steps:
  n) displaying the updated remaining lifetime;
  o) determining whether the current pressure difference reaches the target pressure-difference condition; and
  p) repeating the steps k) to n) before the current pressure difference reaches the target pressure-difference condition.

10. A heating, ventilation and air conditioning (HVAC) apparatus with alerting function for component efficacy declining, the HVAC apparatus comprising:
  a fan being arranged at an air outlet;
  a filter being arranged between an air inlet and the air outlet;
  a pressure-difference transmitter being arranged at two sides of the filter and configured to sense a current pressure difference between the two sides of the filter;
  a memory unit recording a target pressure-difference condition, a first pressure-difference condition and second pressure-difference condition, wherein the second pressure-difference condition is smaller than the target pressure-difference condition and the first pressure-difference condition is smaller than the second pressure-difference condition; and
  a processor being operatively connected to the fan, the pressure-difference transmitter and the memory unit, the processor being configured to continually record a working time of the fan and the current pressure difference, the processor being configured to calculate a first stage slope based on the first pressure-difference condition, an initial pressure difference and the working time of the fan when the current pressure difference reaches the first pressure-difference condition, the processor being configured to calculate a second stage slope based on the second pressure-difference condition, the first pressure-difference condition, and the working time of the fan when the current pressure difference reaches the second pressure-difference condition;
  wherein the processor is configured to use the first stage slope as a base slope to estimate a predicted remaining lifetime for the current pressure difference to reach the target pressure-difference condition when the comparison result is smaller than or equal to a preset threshold; and to use the second stage slope as the base slope to estimate the predicted remaining lifetime for the current pressure difference to reach the target pressure-difference condition when the comparison result is larger than the preset threshold.

11. The HVAC apparatus in claim 10, wherein the processor is configured to calculate the first pressure-difference condition based on a first calculation formula, and to calculate the second pressure-difference condition based on a second calculation formula;
  wherein the first calculation formula is: the first pressure-difference condition=the initial pressure difference+ (the target pressure-difference condition×a first adjusting coefficient);
  the second calculation formula is: the second pressure-difference condition=the initial pressure difference+ (the target pressure-difference condition×a second adjusting coefficient), wherein the second adjusting coefficient is multiple of the first adjusting coefficient.

12. The HVAC apparatus in claim 10, wherein the preset threshold is smaller than 8%.

13. The HVAC apparatus in claim 12, wherein the preset threshold is 5%.

14. The HVAC apparatus in claim 10, wherein the target pressure-difference condition is 150 Pa.

15. The HVAC apparatus in claim 10, further comprises:
  an outdoor damper allowing outdoor air to flow into the HVAC apparatus;

a damper driver electrically connected to the outdoor damper and configured to control an opening and an opening degree of the outdoor damper; and an outdoor air quality transmitter arranged outside the HVAC apparatus and configured to sense an outdoor air quality for air outside the HVAC apparatus;

wherein the processor is operatively connected to the damper driver and the outdoor air quality transmitter and is configured to continually record an opening time of the outdoor damper, the opening degree of the outdoor damper and the outdoor air quality.

16. The HVAC apparatus in claim 15, wherein the processor is configured to perform a linear regression calculation based on the working time of the fan, the opening time of the outdoor damper, the opening degree of the outdoor damper, the outdoor air quality and the base slope when the current pressure difference reaches the second pressure-difference condition to generate a first impact coefficient depending on the working time of the fan, a second impact coefficient depending on the opening time of the outdoor damper, a third impact coefficient depending on the opening degree of the outdoor damper, and a fourth impact coefficient depending on the outdoor air quality, wherein the first impact coefficient, the second impact coefficient, the third impact coefficient and the fourth impact coefficient are constant coefficients with respect to the base slope.

17. The HVAC apparatus in claim 16, wherein the processor is configured to count a preset time period after the current pressure difference reaches the second pressure-difference condition and to calculate a dynamic slope based on an adjusting formula when the preset time period elapses, the processor is configured to update the remaining lifetime based on the dynamic slope;

wherein the adjusting formula is: $S=a_0+a_1W+a_2X+a_3Y+a_4Z$, S is the dynamic slope, $a_0$ is error coefficient, $a_1$ is the first impact coefficient, W is a daily accumulated working time of the fan, $a_2$ is the second impact coefficient, X is a daily accumulated opening time of the outdoor damper, $a_3$ is the third impact coefficient, Y is a daily average of opening degree of the outdoor damper, $a_4$ is the fourth third impact coefficient, and Z is a daily average of outdoor air quality.

* * * * *